（12） United States Patent
Haughwout et al.

(10) Patent No.: US 10,572,296 B2
(45) Date of Patent: Feb. 25, 2020

(54) SYSTEM AND METHOD FOR A DATA PROCESSING ARCHITECTURE

(71) Applicant: Savi Technology, Inc., Alexandria, VA (US)

(72) Inventors: James Haughwout, Alexandria, VA (US); Michael Souders, Oakton, VA (US)

(73) Assignee: Savi Technology, Inc., Alexandria, VA (US)

( * ) Notice: Subject to any disclaimer, the term of this patent is extended or adjusted under 35 U.S.C. 154(b) by 734 days.

(21) Appl. No.: 15/055,637

(22) Filed: Feb. 29, 2016

(65) Prior Publication Data

US 2017/0060622 A1    Mar. 2, 2017

Related U.S. Application Data

(60) Provisional application No. 62/121,906, filed on Feb. 27, 2015.

(51) Int. Cl.
*G06F 9/00* (2006.01)
*G06F 9/46* (2006.01)
*G06F 16/25* (2019.01)

(52) U.S. Cl.
CPC ............ *G06F 9/466* (2013.01); *G06F 16/254* (2019.01)

(58) Field of Classification Search
None
See application file for complete search history.

(56) References Cited

U.S. PATENT DOCUMENTS

| 6,732,137 | B1* | 5/2004 | Dearing | G06F 9/466 |
| | | | | 718/100 |
| 2004/0220934 | A1* | 11/2004 | Dearing | G06F 9/466 |
| 2012/0239479 | A1* | 9/2012 | Amaro | G06Q 20/102 |
| | | | | 705/14.23 |
| 2013/0073586 | A1* | 3/2013 | Aubry | G06F 17/30477 |
| | | | | 707/769 |
| 2014/0280032 | A1* | 9/2014 | Kornacker | G06F 17/30545 |
| | | | | 707/718 |
| 2016/0275411 | A1* | 9/2016 | Kim | G06F 17/30516 |
| 2017/0039252 | A1* | 2/2017 | Bustelo | G06F 17/30551 |
| 2017/0201425 | A1* | 7/2017 | Marinelli | H04L 41/12 |
| 2017/0344910 | A1* | 11/2017 | Wu | G06F 8/71 |
| 2018/0084073 | A1* | 3/2018 | Walsh | H04L 67/2819 |
| 2018/0218069 | A1* | 8/2018 | Rege | G06F 17/30702 |

* cited by examiner

*Primary Examiner* — Belix M Ortiz Ditren
(74) *Attorney, Agent, or Firm* — IP Law Leaders PLLC

(57) ABSTRACT

A data processing system and method integrates speed or transactional sensor data processing with batch level processing of sensor data using a hybrid-Lambda network architecture. In such a hybrid-Lambda network architecture, speed or transactional processing is performed, batch level processing is performed, and batch level processing results can be combined and integrated with the transactional processing events, and visa-versa, such that real time results can be influenced by long term analytics, and long term analytics can be influenced by real time events. For such processing, both speed or transactional and batch level, can occur as result of any type of sensor data being received, processed, and substantially immediately stored in immutable storage locations, for later retrieval and analysis.

36 Claims, 4 Drawing Sheets

SYSTEM AND METHOD FOR A DATA PROCESSING ARCHITECTURE

PRIORITY INFORMATION

The present application claims priority under 35 U.S.C. § 119(e) to U.S. Provisional Patent Application Ser. No. 62/121,906, filed 27 Feb. 2015, the entire contents of which are expressly incorporated herein by reference.

TECHNICAL FIELD

The embodiments described herein relate generally to data processing, and more specifically to an architecture for substantially simultaneous transactional processing, analytics processing and online transactional processing that combines the substantially simultaneous transactional and batch processing with analysis and processing of mutatable states and statuses.

BACKGROUND

Those of skill in the art can appreciate that in the modern world of data processing, there are two main types of processing analytics performed, namely transactional processing, which is speedy but not easily accessible or useful for long-term use and predictive modeling, and batch processing, which affords the latter, but is not made for real-time interaction. Innovators are often left with a trade-off between these two processing analytics, as there has been a need for meaningful integration of their respective features and functions in order to derive more meaningful, accessible information from the data. Additional needs in the technology include universal and easy ingestion of input data regardless of the source, as well as easy and useful accessibility of output.

Consequently, a data processing computer architecture was developed that was called Lambda processing; a Lambda processing architecture combined both high speed transactional processing with batch layer processing. In a traditional lambda architecture, data is received by both a batch and speed layer (layers, in this context, refers to a set of processing modules that are inter-related), and a master set of the received data is permanently stored. In the batch layer, query functions are responded to, resulting in batch views that are stored in the serving layer. These batch views can be constantly re-computed. In the serving layer, the batch views are indexed and stored in a scalable database such that they can be retrieved relatively quickly. New batch views are swapped in as they are generated. It is generally appreciated that the throughput of the batch layer is generally in view of a "long term" approach; consequently, the speed layer compensates for the high latency of the updates for the batch views. Fast incremental algorithms were developed to read/write databases to product substantially real time views. The real time views were then also indexed and cached such that customer or external application inquiries could result in values being obtained relatively quickly. In addition, queries from the customers, or external applications, can be obtained from both the batch and real time views (of the speed layer).

As those of skill in the art can appreciate, however, problems developed with certain applications and Lambda processing. For example, in some cases, the long term batch layer eventual consistency approach led to havoc with real-time command and controls applications. In some cases, data, or devices represented by data, disappeared while being regenerated by the batch layer. In addition, in some applications, very large data costs were incurred via continuous repeat batch operations. By way of still another example, some clients used Amazon Web Services (AWS), which is a collection of remote computing services, also called web services, that make up a cloud computing platform by Amazon.com. The most central and well-known of these services are Amazon EC2 and Amazon S3. AWS provides a large computing capacity (potentially many servers) much faster and cheaper than building a physical server farm. However, if large "batch-level" quantities of data are moved in and out of, or through AWS, the costs can add up quickly.

Thus, there is a need for use of the major components of a Lambda architecture in such a manner that maintains the data analysis benefits, but without sacrificing the integrity of real time application processing.

SUMMARY

An object of the embodiments is to substantially solve at least the problems and/or disadvantages discussed above, and to provide at least one or more of the advantages described below.

It is therefore a general aspect of the embodiments to provide systems, methods, and modes for retaining, storing, and processing sensor data on both a transactional, batch, and combined transactional and batch basis that will obviate or minimize problems of the type previously described.

Described herein is a sensor output data processing system that combines speed or transactional sensor data processing with batch level processing of sensor data using a hybrid-Lambda network architecture. In such a hybrid-Lambda network architecture, speed or transactional processing occurs, as does batch level processing, but in accordance with aspects of the embodiments, batch level processing results can be combined and integrated with the transactional processing events, and visa-versa, such that real time results can be influenced by long term analytics, and long term analytics can be influenced by real time events. Such processing, both speed or transactional and batch level, occurs as result of any type of sensor data being received, processed, and substantially immediately stored in immutable storage locations, for later retrieval and analysis. In addition, specific applications that result from the unique benefits of the hybrid-Lambda network architecture include estimated time of arrival (ETA) analytical processing and congregation analytical processing.

BRIEF DESCRIPTION OF THE DRAWINGS

The above and other objects and features of the embodiments will become apparent and more readily appreciated from the following description of the embodiments with reference to the following Figures, wherein like reference numerals refer to like parts throughout the various Figures unless otherwise specified, and wherein.

DETAILED DESCRIPTION

Figure 1:
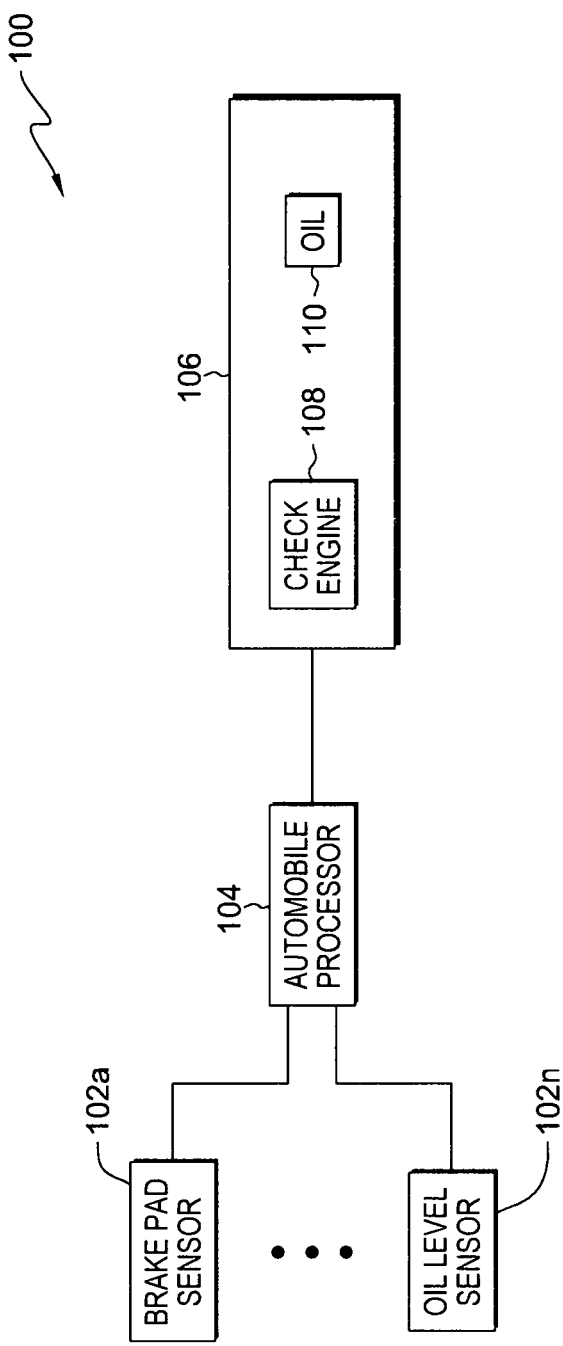
FIG. 1 illustrates a simplified block diagram of an automotive sensor system.

The embodiments are described more fully hereinafter with reference to the accompanying drawings, in which embodiments of the inventive concept are shown. In the drawings, the size and relative sizes of layers and regions may be exaggerated for clarity. Like numbers refer to like elements throughout. The embodiments can, however, be embodied in many different forms and should not be construed as limited to the embodiments set forth herein. Rather, these embodiments are provided so that this disclosure will be thorough and complete, and will fully convey the scope of the inventive concept to those skilled in the art. The scope of the embodiments is therefore defined by the appended claims.

The following embodiments are discussed, for simplicity, with regard to the terminology and structure of sensor data in terms of utilization within a computerized network. However, the embodiments to be discussed next are not limited to these systems but can be applied to other sensor systems that can include processors, or other types of circuitry, but which do not include networks other than those within a particular business entity.

Reference throughout the specification to "one embodiment" or "an embodiment" means that a particular feature, structure, or characteristic described in connection with an embodiment is included in at least one embodiment of the embodiments. Thus, the appearance of the phrases "in one embodiment" on "in an embodiment" in various places throughout the specification is not necessarily referring to the same embodiment. Further, the particular feature, structures, or characteristics can be combined in any suitable manner in one or more embodiments.

According to certain embodiments, the problems described above can be addressed by, for example, combining speed or transactional sensor data processing with batch level processing of sensor data. In certain of these exemplary embodiments, a hybrid-Lambda network architecture is employed. In such a hybrid-Lambda network architecture, speed or transactional processing occurs, as does batch level processing, but in accordance with aspects of the embodiments, batch level processing results can be combined and integrated with the transactional processing events, and visa-versa, such that real time results can also be influenced by long term analytics, as well as long term analytics being be influenced by real time events. Such processing, both speed or transactional, and batch level, occurs as result of any type data that can be received. For example, the data may be sensor data that is received, processed, and/or substantially stored (immediately, or over a period of time) in immutable storage locations. In addition, specific applications that result from the unique benefits of the hybrid-Lambda network architecture include estimated time of arrival (ETA) analytical processing, and congregation analytical processing.

Beginning with FIG. 1, the figure illustrates a simplified block diagram of an exemplary sensor system 100. This exemplary sensor system 100 is used for illustration purposes only, as the network architecture according the embodiments can be used with any type of system as further described below.

In an exemplary embodiment, system 100 comprises an automotive sensor system 100, that includes brake pad sensor 102a, and oil level sensor 102n, automobile processor 104, and dashboard 106.

In dashboard 106 are located the ubiquitous check engine indicator 108, and oil level warning indicator 110. Those of skill in the art can appreciate that there are substantially more sensors in even the most basic automobiles presently available, and that the indicators illustrated in FIG. 1 could be actually displayed on a touch screen panel, as well as in a dashboard indicator.

Processor 104 typically will periodically poll each of the sensors it is connected to, and monitor the status of the device to which the sensor is attached. In FIG. 1, processor 104 substantially continuously polls brake pad sensor 102a, and oil level sensor 102b, and reports their condition(s) to the appropriate indicators. In the event that both are working or operating normally, or in a normal condition (i.e., not below a certain threshold), then no indication is provided. If, however, one or both exceed some predetermined level, then processor 104 issues the change of status indication, so that the operator of the automobile can take the appropriate corrective action, if desired.

This kind of substantially continuously monitoring by automobile processor 104 can be referred to as speed or transactional processing. The processing occurs at, or in near-real time. The analytical, or processing speed is based, in part or in whole, on both the sensor technology and the necessity for reacting to negative events (or positive events, in some circumstances).

In exemplary embodiments, the foregoing transactional processing is performed in cooperation, coordination or integration with batch layer processing.

Figure 2:
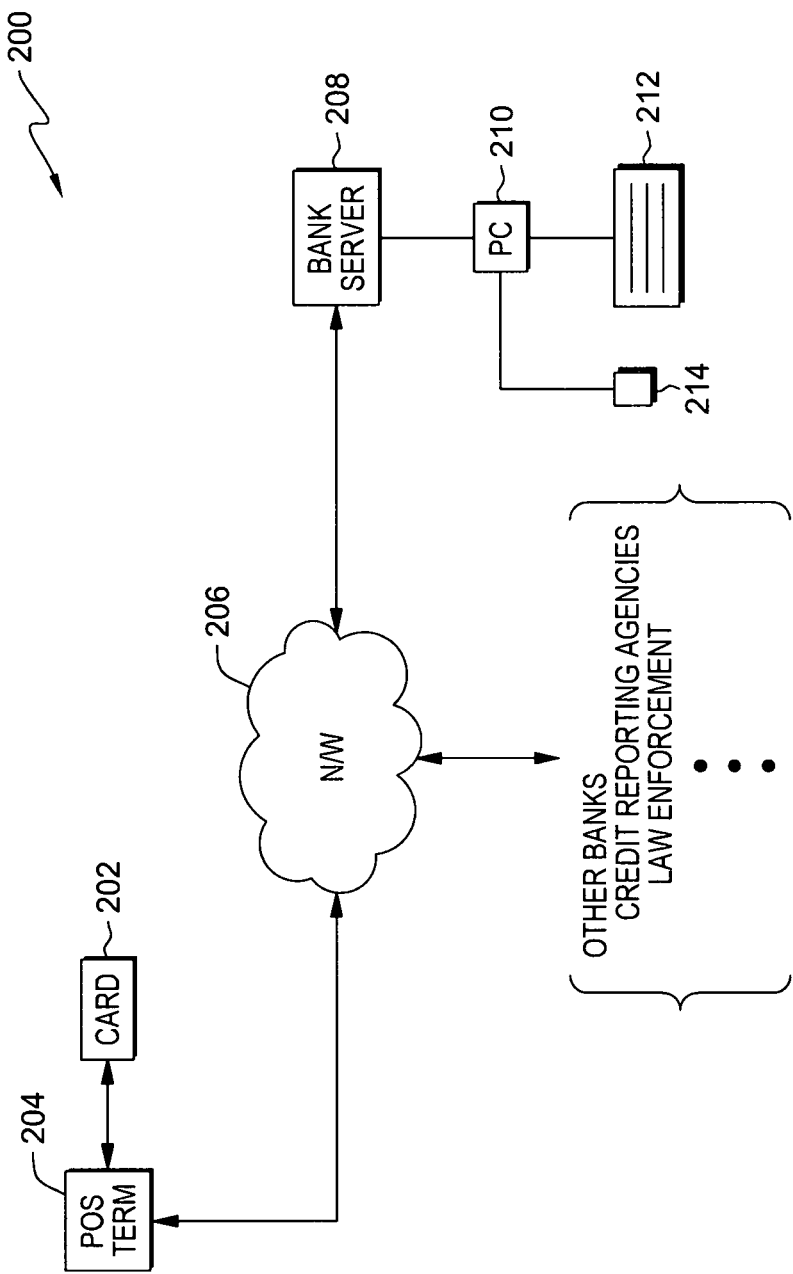
FIG. 2 illustrates a simplified block diagram of a credit card payment system.

To illustrate the concept with another real-life example, FIG. 2 provides a credit card payment system 200. Here, a consumer will try and use their credit card 202 at a point of sale (POS) terminal 204 to make some type of purchase. The attempted purchase information is transferred, via network 206, to a locally or remotely located bank server 208, wherein the information of the attempted sale is checked against existing records in regard to that particular customer and their credit card account. This type of processing has to occur very quickly, or people would be much less disposed to use their credit cards 202. Thus, there is an element of speed or transactional processing in this credit card system.

In addition, however, batch processing is also involved in the exemplary credit card processing system 200. At the end of the billing cycle, credit card system 200, perhaps in response to a report generation command received at serve 208 via keyboard/mouse 212, 214 and personal computer (PC) 210, will access all of the records kept by credit card system server 208 and find all of the charges associated with credit card 202, and send the customer a bill. In this embodiment, such report generation is not performed in real time, although it acts upon the real time generated information made during the purchase.

In exemplary embodiments, a sensor analytical system and process combines the transactional and batch aspects, as described below in greater detail in regard to the aspects of the embodiments.

Figure 3:
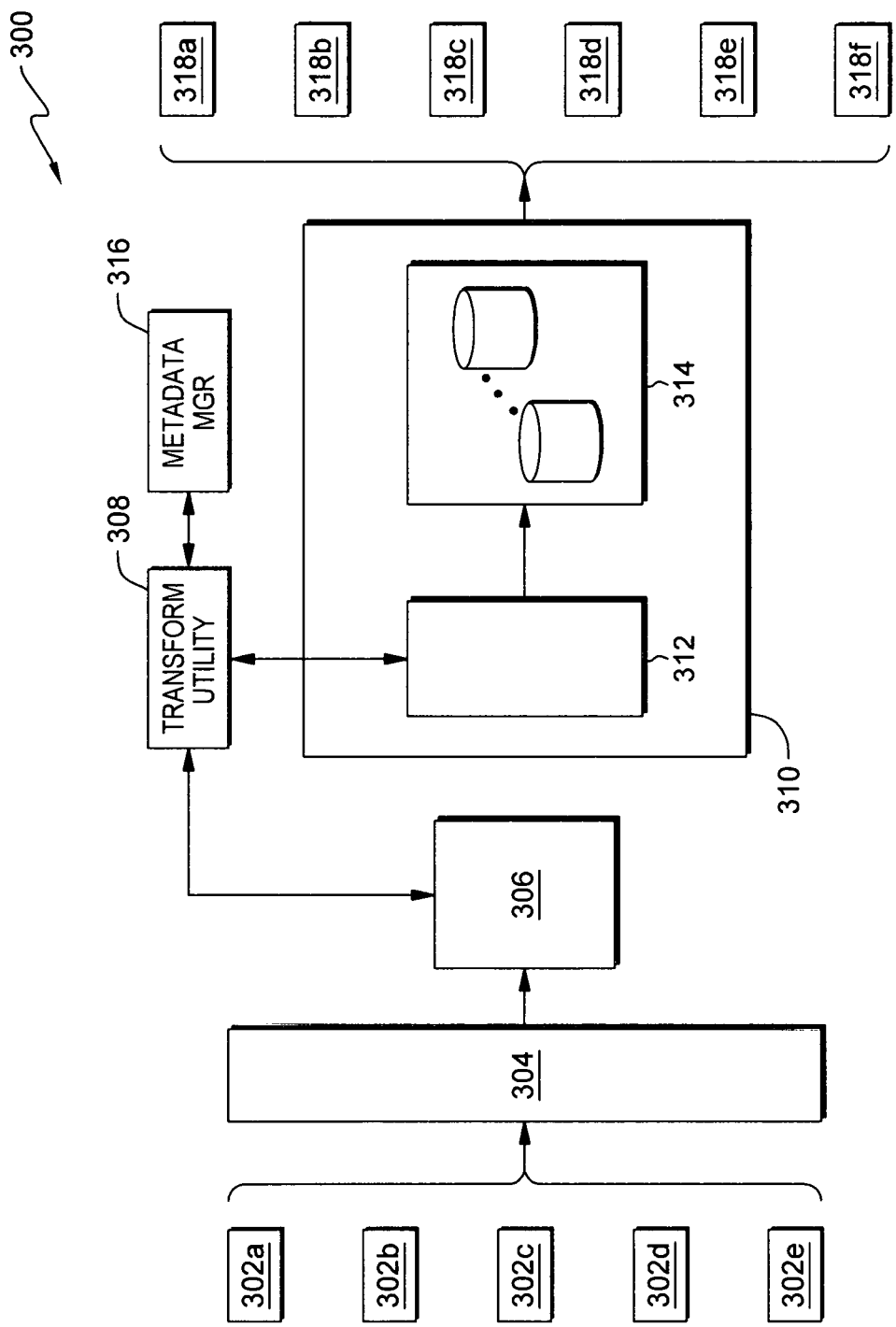
FIG. 3 illustrates a hybrid-Lambda data flow and processing block diagram according to aspects of the embodiments.

FIG. 3 illustrates hybrid-Lambda data flow and processing block diagram (hybrid-Lambda data flow block diagram) 300 according to aspects of the embodiments. In hybrid-Lambda data flow block diagram 300, there are several main components. The inputs are sources of data 302, the outputs are processed data 318, and processing is performed therein between by a series of layers comprising the hybrid-Lambda architecture.

In the particular implementation illustrated, the data is sensor detected, and the elements are as follows: sensor data source type 302, network interface 304, sensor raw data 306, sensor data transform utilities 308, data memory storage 310 (including normalized/structured sensor data 312 and long term sensor data storage 314), hybrid-Lambda metadata manager 316, and processed sensor data viewports/customers 318.

In FIG. 3, a plurality of sensor data source type 302 is received by the network interface 304. Such sensor data source types 302 are not in any way limited to particular technologies, and can include active sensor outputs, passive sensor outputs, wireless sensor outputs, Bluetooth (BT) sensor outputs, and substantially any other type of sensor data output in substantially any type of protocol or format. In an exemplary embodiment, the sensor data is received and stored in the format that it was received in.

The sensor data 302 can be synchronous or asynchronous, and can come from virtually any type of sensor, or from other applications, including customer applications, or third party applications. By applications, skilled persons will appreciate that this means some form of computer-driven program or software, and includes modules and Apps, as such terms are defined below. As discussed above, the sensor data outputs can be literally any type of data from any type of sensor, and can further include not only purely physical attributes, but also informational data in electronic form.

Following receipt into the network interface 304, the data exists as sensor raw data 306, and is transformed within transform utility 308, although the sensor raw data 306 is retained for long term storage purposes. However, one output of transform utility 308 is normalized/structured sensor data 312 that is stored, along with sensor raw data 306, in data memory storage 310. Long term sensor data storage 314 stores not only normalized/structured sensor data 312, but also sensor raw data 306. Following additional processing, described in greater detail below with regard to the remainder of the Figures, reports and further analytics are output to one or more processed sensor data viewports/customers 318, for further processing, generation of further actions, or off-site storage, among other actions. Hybrid-Lambda metadata manager 316 monitoring the entire system and process via internal controls.

Figure 4:
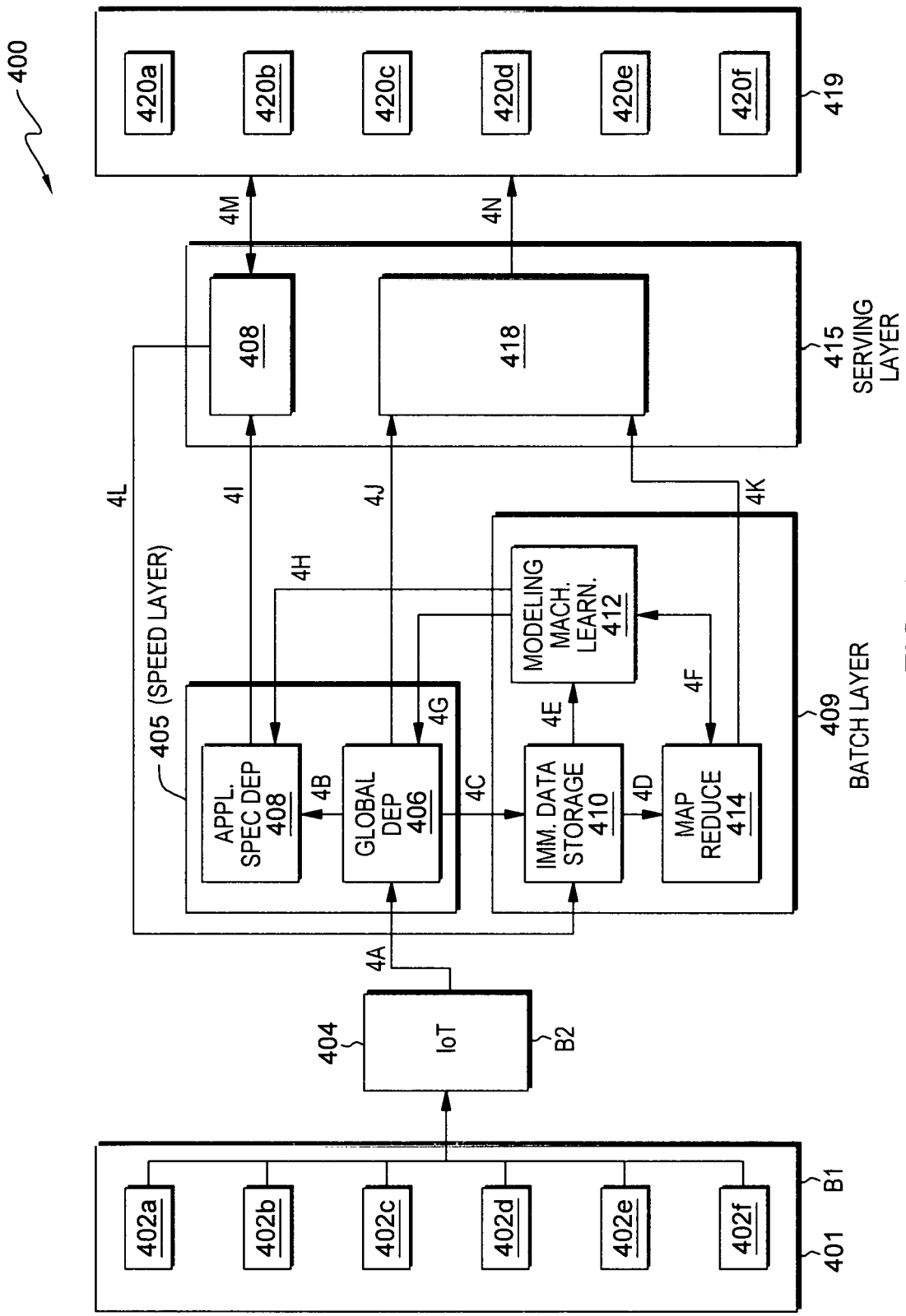
FIG. 4 illustrates a hybrid-Lambda network architecture block diagram according to aspects of the embodiments.

Not shown, but of particular interest to the data flow and processing diagram 300, and which is described in greater detail in regard to at least FIG. 4, is the time based aspect of sensor data 306. In exemplary embodiments, time based (CEP) rules are applied to the raw and normalized/structured sensor data 312 based on the type of sensor data and the business rule that has been provided for the report generation. Such business rules, according to aspects of the embodiments, can be different based on the needs of the customers, the different types of hardware on the sensor, and the speed or batch layer processing that is to occur. Furthermore, according to aspects of the embodiments, one or more sensor data is processed immediately, if it is characterized as speed or transactional sensor output, such that immediate reports can be generated. According to further aspects of the embodiments, speed data is that data that can be characterized as "transactions," and which can or should be processed in the order of seconds, by applying complex event processing, and direct changes to the asset state, and which can further be used to create alerts, notifications, and the like. Batch data, however, can be considered to be much more general. Some batches are metadata updates, and others are batch-only transactions, which can be expected to be processed on the order of hours; according to aspects of the embodiments, batch data, by definition, substantially never needs real-time processing; it simply needs daily or hourly updating.

In exemplary embodiments as discussed in greater detail below, predictive modeling and artificial intelligence is performed within the architecture of FIGS. 3 and 4. In such embodiments, data is structured and normalized, and stored in specific applications, such as an Oracle database. In this particular example, the structured and normalized sensor data can be saved in the Oracle database, and then a tracking module or set of modules extract it, further process it, and present it in different manners to persons or applications (such as via charts, tables, written reports, and the like).

As described above, aspects of the embodiments include time based processing (speed or transactional processing and batch layer processing): consequently, and as a result of further aspects of the embodiments, the models and business rules, can get "smarter" over time, meaning that data outputs for given inputs are used to train the system.

One aspect of the embodiments of the inventive hybrid-Lambda based network is identification of how particular input data, such as sensor outputs, are to be processed, either by a speed or transactional basis, a batch basis, or an integration of the two. For example, if there is a shipping container that has a tamper sensor, the processing time for that sensor output will be over a short period of time, as the company will want to respond quickly to tamper alerts. However, a speed or acceleration sensor output does not necessarily need to be processed as quickly, and so this can be done on a batch basis. Nonetheless, according to further aspects of the embodiments, there is an intersection of data analysis between the transactional and batch level processing. As one example, (i) further processing of the acceleration sensors is performed, and (ii) is matched to the tamper alerts. It can be determined (iii) that at certain periods of time when higher amounts of acceleration sensor outputs were generated, so were the tamper alerts. The synthesis of data indicates that a review of the quality of the roads might be in order, as roads with more potholes create such conditions.

According to further aspects of the embodiments, the hybrid-Lambda network architecture is further well suited to the creation of business rules using software modules that acquire, track, and process complex, longer time-period events. In an exemplary embodiment, such business rules are pushed into an enterprise resource planning (ERP) business management software suite, which is a suite of integrated applications that a company can use to collect, store, manage, and interpret data from many business activities, including product planning, manufacturing or service delivery, marketing and sales.

Discussion is now directed towards aspects of the embodiments that involve the hybrid-Lambda network architecture, shown in a simplified block diagram in FIG. 4. The received sensor data can be structured, unstructured, or semi-structured.

According to further aspects of the embodiments, the hybrid-Lambda network architecture can handle both transactional and batch processing of sensor data, using multi-phased complex event processing algorithms in the form of business rules, which can be both pre-defined and have the ability to change and learn and create new models based on previous results.

Because many different types of data can be successfully handled, processed, analyzed, and reports generated within the one hybrid-Lambda network architecture, complex integration delays are substantially avoided as might occur in other conventional processing systems that do one or the other of transactional or batch processing. The delays are avoided because time consuming transfers, which may involve new formatting, are substantially, if not wholly, eliminated. Thus, according to further aspects of the embodiments, applications, analytics, and complex event processing modules can interact with each other substantially seamlessly. Further still according to additional aspects of the embodiments, the hybrid-Lambda network architecture is horizontally scalable, on the fly, to millions of transactions per second. There are no single points of failure, and users and customers are provided with sub-second visualization of data analysis and performance queries.

Attention is now directed towards FIG. 4, which illustrates hybrid-Lambda network architecture block diagram (hybrid-Lambda network architecture) 400 according to aspects of the embodiments. Hybrid-Lambda network architecture 400 includes the following components: raw sensor data sources block 401; internet-of-things (IoT) protocol adapter/integration layer (IoT protocol adapter) 404; global complex event processing (CEP) block 406; application specific CEP module 408 (modules 406 and 408 make up speed layer 405); immutable data store module 410, modeling machine learning module 412; map/reduce module 414 (modules 410, 412, and 414 make up batch layer 409); application views module 416; serving layer views 418 (modules 416 and 418 make up the serving layer 415); and reports/customer 420 (which make up data export layer 419). It will be understood by those of skill in the art that although shown in a manner consistent with a traditional lambda architecture, the hybrid lambda architecture according to aspects of the embodiments as briefly illustrated in FIGS. 3 and 4 is substantially different, novel, and non-obvious in regard to the conventional lambda architecture. Thus, notwithstanding the use of similar terms such as "speed layer," "batch layer," and/or "serving layer," it is the aspects of the embodiments expressly described herein that governs what these architecture elements mean, and how they perform and operate.

As used herein, CEP references event processing that, for example, combines data from multiple sources to infer events or patterns that suggest more complicated circumstances. CEP technology is used in certain embodiments to identify meaningful events, and provide the opportunity to respond to the same quickly and efficiently. In exemplary embodiments, CEP is implemented in one or a series of modules, that use any combination of resident and/or remote software, hardware or combination hardware/software devices.

In hybrid-Lambda network architecture 400, a vast number of sensor data sources 402 can generate raw sensor data, as shown in raw sensor data source block 401. Examples of raw data sources include sensor data, mobile applications (Apps), enterprise specific data, enterprise-partner data, as well as open data. As described herein, some sensor data is transactional, meaning that it is or should be processed in "real time," e.g., data that should be acted on as quickly as it is received. Further, some of the sensor data is batch data; sensor data that is generated and sent over longer periods of time and that represents events or actions that occur much less frequently than the transactional sensor data.

According to further aspects of the embodiments, there are also one or more examples of sensor data that can be considered to be defined between the two above-identified types of data. A first example is sensor data that is sent as batch data (usually meaning in larger quantities, or because it has been stored over longer periods of time) but that is really transactional data. Batch-to-transactional sensor data can or should be separated and then processed as transactional sensor data. In addition, there is the example of the opposite type of batch-to-transactional data, which is sensor data sent in a transactional manner, but which really needs to be processed in a batch manner i.e., in aggregate manner.

An example of the former are electronic data interchange (EDI) transactions, which are an example of batch-to-transactional data. EDI data transfers are a single transfer (the batch) that groups a set of one or more status messages (the transactions). There is an expectation that each status message needs to be processed as a transaction to generate an event such as a location change or schedule update. An example of the latter (transactional-to-batch) is the single transaction posting (via a web service of a group (i.e., a batch)) of data transactional events that have an expectation of collective (i.e., batch) processing.

According to further aspects of the embodiments, any and all of the data types can be received by IoT protocol adapter 404, wherein the data is received, processed, and output to the global complex event processing (CEP) module 406, as shown by path 4A. That is, according to further aspects of the embodiments, IoT protocol adaptor 404 is a universal translator; this turns the received raw sensor data, regardless of whatever data format/protocol it was received as (structured, unstructured, semi-structured), into Jason data.

As described before, global CEP module 406 is part of the transactional or speed layer, meaning the business rules that encompass global CEP module 406 are designed to act on the sensor data in a near real time fashion; one of the business rules of global CEP module 406 is designed to preserve the raw sensor data in its original format for immutable storage and possible future processing as needed according to aspects of the embodiments; therefore, one output of global CEP module 406 is directed towards immutable data store module 410 (via path 4C), and a second output is directed to application specific CEP module 408, via path 4B, according to aspects of the embodiments.

In regard to modules 404 and 406, in combination, and according to further aspects of the embodiments, these operate to provide fault-tolerant ingestion of data, and generic sensor complex event processing to strip out duplicates, shunt a copy of the raw data to immutable data storage module 410, and provide basic routing to other modules in hybrid lambda architecture 400. According to aspects of the embodiments, the use of Kafka processing modules/programs at the ingress of IoT module 404 and the egress of global CEP module 406 enables hybrid lambda architecture 400 to withstand spikes, and perform maintenance on downstream systems without substantial, if any, loss of data. According to still further aspects of the embodiments, IoT protocol adaptor 404 can contain things like General Packet Radio Service (GPRS) (e.g., 2G/3G cellular communications systems) servers and application program interface (API) gateways. According to an aspect of the embodiments, IoT protocol adaptor can export data to global CEP module 406 using a Savi Message format. According to still further aspects of the embodiments, the combination of IoT protocol adaptor 404 and global CEP module 406 will become an asynchronous queue between two or more Savi modules, such as by way of non-limiting example only, Savi Tracking, among others. According to still further aspects of the embodiments, the output of global CEP module 406 is a message that can be categorized as unique for further processing.

Application specific CEP module 408, which receives as in input messages or data output from global CEP module 406, performs domain specific processing on those messages. Such domain specific processing can include, mapping of data into a common format to simplify downstream processing, application of source specific rules, and application of partner related processing (e.g., partner specific process such as INTTRA processing (INTTRA, as those of skill in the art can appreciate, is an e-commerce platform commonly used in the ocean freight industry, and initiates almost 300,000 container orders per week, representing more than 10 percent of global ocean container trade) or other partner type processing such as telematics, among others). According to further aspects of the embodiments, application specific CEP module 408 can generate events and alerts, update scenarios, and can further pass processed data along to other layers and modules, as shown in FIG. 4.

According to still further aspects of the embodiments, application specific CEP modules 408 comprise transactional or speed-based business rules that are specific to the customer's needs in regard to their sensor data. For example, such business rules could encompass a monitoring of a thermometer sensor such that if an over-temperature condition is detected, the particular business rule within application specific CEP module 408 will create an output that causes another business rule to create a shutdown or warning signal. Such business rules are discussed in greater detail below. The output of application specific CEP module 408 is sent to application view module 416, which is part of serving layer 415, as shown by path 4I. A third output of global CEP module 406 is sent to serving layer views module 418 via path 4J, which is part of serving layer 415. Serving layer 415 and its modules are discussed in greater detail below.

As part of serving layer 415, application views 416 provides a real-time, or substantially real-time view of data processed by application specific CEP module 408; as opposed to the conventional Lambda architecture, the real-time view afforded by hybrid lambda network architecture 400 will remain a full-fledged relational database management system (RDBMS) (i.e., one with spatial capabilities). According to further aspects of the embodiments, use of application view module 416 provides not only a repository of host sensor data, but also application-specific data (e.g., asset definitions, journeys, among other types). In addition, and according to further aspects of the embodiments, hybrid lambda network architecture 400 and application views module 416 will not destroy and regenerate real-time views (as the conventional Lambda architecture does): instead, the data that is created by application view module 416 is fed into immutable data store 410 (via path 4G) for use in modeling and machine learning module 412, and scenario population. According to further aspects of the embodiments, this can be accomplished or embodied via a traditional operational data store-enterprise data warehouse (ODS-EDW) fetch (such as with Sqoop). According to further aspects of the embodiments, and as shown in FIG. 4 as paths 4M and 4N, these updates will be posted to Kafka for downstream consumption by substantially any subscriber.

In further regard to application specific module 408, and according to further aspects of the embodiments, with IoT protocol adaptor 404, there will less processing needed in applications like Savi Tracking (e.g., there will no longer be a need for GPRS tag ingestion and queuing). However, as shown in FIG. 4, domain-specific, or application specific complex event processing will take place in application specific CEP module 408; this type of processing can include business rules for track and trace, asset management, consignment, among others. According to further aspects of the embodiments, these business rules can be embodied in Drools or Storm. Referring back to batch layer 409, after raw sensor data is received and stored in immutable data store module 410, such data can be processed by both map reduce module 414 via path 4D, and by model machine learning module 412 via path 4E. Prior to discussing modeling, machine learning module 412, however, immutable data store module 410 will be described in greater detail. As those of skill in the art can appreciate, the Hadoop distributed file system (HDFS) is a distributed file system designed to run on commodity hardware. It has many similarities with existing distributed file systems, but also includes several differences that make it useful in hybrid lambda network architecture 400. For example, HDFS is considered to be highly fault-tolerant, and is designed to be deployed on low-cost hardware. HDFS also provides high throughput access to application data and is suitable for applications that have large data sets. HDFS offers a neutral, highly-durable, highly-scalable permanent store of the immutable data received and generated by hybrid lambda network architecture 400. Immutable data store module 410 can be used for data science exploration via Hive, MapReduce, and Mahout, and can also provide for reclassification and re-scoring of past data, and recovery and reload in the event of errors (e.g., when bad data is received at hybrid lambda network architecture 400 due to unplanned firm-ware changes), among other uses. Notwithstanding the complexity of HDFS in comparison to other large data storage system, HFDS provides the ability to provide on-premise solutions as well as hosted ones. In addition, and according to further aspects of the embodiments, AWS Glacier can be used for long-term backup of HDFS.

Modeling, machine learning and map reduce modules 412, 414 can exchange processed data according to further aspects of the embodiments, as evidenced by path 4F which shows the bidirectional nature of the path. According to further aspects of the embodiments, the batch processing that occurs in batch layer 409 occurs in the two modules 412, 414; such batch processing not only creates new data based on long term views of the sensor data, but can also feed back into current processing as evidenced by path 4H shown between modeling machine learning module 412 and application specific CEP module 408. This then means, according to further aspects of the embodiments, that hybrid-Lambda network architecture 400 can create models based on new and existing sensor data, such that trends, and outliers can be detected and reported via the application specific CEP module 408. According to further aspects of the embodiments, modeling, machine learning module 414 comprises a set of tools that can be used to explore data (stored in immutable data store module 410, among other locations), build classifications, build scoring models, among other uses. Map reduce module 410, according to further aspects of the embodiments, comprises a set of tools that provides for data science exploration, reclassification and re-scoring of past data, among other uses.

As those of skill in the art can appreciate, data that represents an event by itself is essentially meaningless, other than reporting of the event. According to aspects of the embodiments, through use of hybrid lambda network architecture 400, and in particular modeling, machine learning module 412, and map reduce module 313, pairing of the event to logistics plans, physical things, workforce objects, locations and time adds significant value. Use of online transaction processing (OLTP), which is a class of information systems that facilitate and manage transaction-oriented applications, typically for data entry and retrieval transaction processing, can provide, in accordance with aspects of the embodiments, views of the event at a substantial speed and scale. According to still further aspects of the embodiments, use of OLTP within hybrid lambda network architecture 400 and modeling, machine learning module 412, and map reduce module 313 provides a common foundation for sensor (and external transactional) data fields around which can be built libraries of Storm, MapReduce, and Machine-executed Models to process data more easily and more rapidly. Consequently, and in accordance with further aspects of the embodiments, Storm bolts (e.g., business rules) can operate faster, and share information in context for external system processing. According to an aspect of the embodiments, it can break any set of events into transactions of single events; this facilitates more scalable topology touting and recovery, and pre-processes data for presentation in tables, graphs, charts, among other means of displaying data.

Serving layer 415 receives, as inputs, an output from map reduce module 414 via path 4K, an output from global CEP module 406 via path 4I, and an output from application specific CEP module 408 via path 4I. A first output of application views module 416 is fed back to immutable data store module 410, so that the results of the business rules can be stored along with the raw sensor data for future analytical processing, if desired.

The outputs from serving layer 415 is sent to data export layer 419 via paths 4M (bidirectional from application views module 416 and 4N (uni-directional path from serving layer views module 418). Following the processing by the business rules as embodied in CEPs of application specific CEP module 408, modeling machine learning module 412, and map reduce module 414, the processed sensor data is eventually received in data export layer 419 and a plurality of reports and customers 420 receive the data.

As described briefly above, sensor data can come out simultaneously from both speed layer 405, and batch layer 409 to be processed in serving layer 415, and more specifically serving layer views module 418, for immediate use. According to aspects of the embodiments, global CEP module 406 structures the received raw sensor data in such a manner that it can be used in a structured manner; this means it can be input into standard Apps, such as Apps for tracking and related applications, as well as in customer's Apps. According to further aspects of the embodiment, serving layer views module 418 can be embodied using Cassandra, which supports large-scale reads and writes, natively integrates with Storm, and natively supports the functionality associated with map reduce module 414. According to still further aspects of the embodiment, use of Cassandra, or equivalent devices, provides hybrid lambda network architecture 400 with the ability to use serving layer views module for a variety of uses, such as housing Insight Scenario data, housing data for real-time scoring, and serving up data for display of reports in other systems (e.g., Savi Tracking).

According to aspects of the embodiments, the output of speed layer 405 is input into real time applications for near real-time processing, while the batch output data goes into longer period of time applications and subsequently is processed over longer periods of time. The result is that sensor data that is processed according to aspects of the embodiments by the hybrid-Lambda network architecture 400 of FIG. 4 provides not only a daily report, but also provides reports capable of being updated in real time because of the transactional layer processing.

For example, a shipping company might want to know what is the average speed over the trip of the truck, and what is its instantaneous velocity. According to a further example, suppose weather sensors were outputting data into hybrid-Lambda network architecture 400: a relevant question is not only what is the average temperature for this particular geographical area over all recorded time, but, in addition: what is it for this season, what is it for this month over all time, what is it for just this month, what is it for this day of the month over time, what is the average temperature for just this day, what is it for this hour of the day, and finally, what is the real temperature right now? As one of skill in the art can appreciate, business rules that create the CEP events can interpret the weather data to provide such answers, instantaneously, and on-the-fly, but only if hybrid-Lambda network architecture is used to process the weather data in both a speed or transactional basis and a batch basis.

According to a further aspect of the embodiments, it can be preferable to use batch computation for relatively larger data sets, and to use speed computation for relatively smaller data sets. Both computations can be performed and combined in real time. As can be appreciated by those of skill in the art, prior to the hybrid-Lambda network architecture described herein, such sensor data processing has not been realized. That is, in traditional sensor network architectures there are generally only speed layers: someone sends transactional data and if the server is up, it is stored and processed, and if the server is down, the data is missed, and lost, probably forever. If the server is up and running, the received sensor data is put into a database (presuming, of course, that the received sensor data is in a recognized sensor data protocol, as other sensor network architectures lack IoT protocol adaptor 404 according to aspects of the embodiments), and it is processed immediately. But once the received data sets becomes large enough, and there is a desire to perform deeper analytics, prior art systems cannot match the capability and performance of the hybrid-Lambda network architecture, and subsequently processing fails to deliver the desired results, or delivers results that are substantially delayed.

It can further be appreciated by those of skill in the art, that prior art systems that store sensor data transactional processing finds that such storage is not conducive for analytics on large scale. For example, once Twitter and Facebook reached a certain market penetration or share, they wanted to see and display trends pertaining to their particular product. But, it was determined by each that such trend analytics could not be done using traditional or currently available sensor data network architectures. As a result, Lambda architecture was created, which treated data differently. However, according to further aspects of the embodiments, instead of doing archeology on transactional data to figure out what happened, the Lambda architecture took the data raw, and continuously reinterpreted it in batch and on a streaming manner. This can be considered to be a continuous reinterpretation of the sensor data. In some cases, this worked well, but in other cases, this resulted in less than ideal results. Consequently, it became known that Lambda architecture was good for speed or transactional analytics, and that classical batch layer architecture was good for business transactions, e.g., I have an order, and it doesn't change over time. And, because it's a much slower moving item, the data does not need to be reinterpreted. What was missing, however, was an easy, efficient, and effective network architecture that combined the best of both types of sensor data analysis: speed and batch layer processing. According to aspects of the embodiments, the hybrid-Lambda network architecture combines the two to create, in a synergistic manner, a sensor output data analytical processing system and method which exceeds the sum of the individual capabilities of the prior art methods.

According to further aspects of the embodiments, traditional Lambda architecture allows for reinterpretation of data; but, when this is applied to a thing, with a state, erroneous results can sometimes be obtained. For example, with truck shipping data, it is not necessary to reinterpret the truck: this, however, is what a traditional Lambda architecture would do. In a traditional Lambda architecture, sensor data would cause new rules to be created that would or could eventually reinterpret the static fixed object, in this case, the truck. While it is generally a good thing for a sensor data architecture to learn from past data, it can be problematic if the fundamental nature of static objects disappears over time. Another example of how static objects can change based on recent changes in sensor data that can arise for a Lambda architecture application includes the example of Company A taking over Company B. Prior to the event, there were company A people and company B people; but after the event, company A will view the company B people through the prism of company A's personnel definitions, and the existence of the company B people will or can simply disappear. Another example is if a famous personality joins twitter and gets a following; an athlete, for example. But at some point, the athlete starts to sell or push his or her athletic apparel products using their hashtag. People will now look at the athlete as nothing more as a spammer, and will ignore that person; the famous personality still exists, but as far as others are concerned, he or she is now a non-entity.

According to further aspects of the embodiments, the hybrid-Lambda network architecture according to aspects of the embodiments tracks and manages sensor data (including static items), and does not let them change or disappear. The hybrid-Lambda architecture takes a permanent state item found in transactional architecture and then applies data learned with Lambda that continuously changes as it learns more, to combine them together to affect how the permanent state item is viewed.

According to still further aspects of the embodiment, the hybrid-Lambda network architecture keeps sensor data in its raw, unprocessed state because it can be very valuable over time; new rules can be applied to the original data that can affect how the original event is viewed. In some cases, this can be compliance directed (e.g., Federal Department of Agriculture (FDA), or Center for Disease Control (CDC) rules). By way of example, suppose there was a medical sensor attached to a pacemaker: the sensor receives and stores the patient's heartrate. A later review of the heartrate data shows that something that occurred really was different than originally perceived: it may have been viewed as a heart attack, but data analysis can show that it was a faulty sensor, or that the person was exercising when they should not have been, and it is only with a combination of transactional processing and batch layer processing that the real situation is determined. According to aspects of the embodiments, saving old data provides the benefit of "dynamic reinterpretation."

As described above, and in accordance with further aspects of the embodiments, batch layer processing can improve upon rules that were first institutionalized by human drafters in the form of business rules in the CEP modules described earlier. That is, the rules discussed above can be both or either of human made or machine learned. According to aspects of the embodiments, modeling machine learning module 412, located in batch layer 409, can learn by analyzing the historical sensor data, build an interpretation of that data, and then creating a new/improved model.

According to further aspects of the embodiments, there are innumerable uses of the disclosed hybrid-Lambda network architecture. For example, such uses can include payment processing by credit card companies; in a transactional sense, they must process data immediately, to enable a purchase to occur or not, and in a batch layer sense, they need to create bills to send to customers, and in addition can "mine" the purchasing data for valuable information about their credit card users' purchasing habits. However, with use of the hybrid-Lambda network architecture, not only can the purchasing data be processed on a transactional basis, but real time, on-the-fly reports can be created that substantially continuously provide updates about what is happening (trends, ATM withdrawals, and the like), and can perform immediate fraud protection.

According to still further aspects of the embodiments, other uses of the exemplary hybrid-Lambda network architecture can include financial applications (e.g., brokers of stocks, bonds, securities markets), the military, airlines, trains, highway traffic control, medical studies, weather prediction and mapping, shipping (UPS, FEDEX, local shipping companies), geology, astronomy, biological and disease control/prevention (CDC), disaster relief (American Red Cross), social Media, and voting, among others. Essentially any subject matter wherein contemporary and historical data can be mixed to provide better information and analysis about the current, present and future events can benefit from the use of the hybrid-Lambda network architecture.

According to aspects of the embodiments, described herein is hybrid lambda network architecture 400 that provides an architecture that supports a high-scale data- and application-centric software as a service (SaaS) business. According to aspects of the embodiments, hybrid lambda network architecture 400 provided herein will allow or provide for the relatively easy addition of customers, at low cost. Hybrid lambda network architecture 400 according to aspects of the embodiments will embrace the Unix philosophy, which means designing for failure; that is: handling server outages, bad data, spike loading and absence of data in a self-healing, fault-tolerant manner. According to further aspects of the embodiments, hybrid lambda network architecture 400 will be able to easily integrate and ingest new—and external—tags, sources of data, and apps, among other items. Further, hybrid lambda network architecture 400 will be able to scale horizontally, and allow the customers or users to optimize operational management and decision making through high-scale, performant real-time Apps (e.g., SMTS) and complex event processing (CEP). Customers will be able to optimize strategic change and optimization through high-scale, insightful and easy-to-understand applied data science (e.g., reports, algorithms, scoring, categorization), as generated by hybrid lambda network architecture 400, as described herein, and according to still further aspects of the embodiments, hybrid lambda network architecture 400 will use open-source based software to be cost-effective, and will minimize hosting and data transfer costs (i.e., "hidden" cloud costs).

The disclosed embodiments provide a source array, computer software, and a method for processing sensor data using speed and batch layer processing It should be understood that this description is not intended to limit the embodiments. On the contrary, the embodiments are intended to cover alternatives, modifications, and equivalents, which are included in the spirit and scope of the embodiments as defined by the appended claims. Further, in the detailed description of the embodiments, numerous specific details are set forth to provide a comprehensive understanding of the claimed embodiments. However, one skilled in the art would understand that various embodiments can be practiced without such specific details.

Although the features and elements of aspects of the embodiments are described being in particular combinations, each feature or element can be used alone, without the other features and elements of the embodiments, or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and can include other examples that occur to those skilled in the art. Such other examples are intended to be within the scope of the claims.

The above-described embodiments are intended to be illustrative in all respects, rather than restrictive, of the embodiments. Thus the embodiments are capable of many variations in detailed implementation that can be derived from the description contained herein by a person skilled in the art. No element, act, or instruction used in the description of the present application should be construed as critical or essential to the embodiments unless explicitly described as such. Also, as used herein, the article "a" is intended to include one or more items.

All United States patents and applications, foreign patents, and publications discussed above are hereby incorporated herein by reference in their entireties.

We claim:

1. A data processing method, comprising:
   receiving sensor data that comprise a plurality of transactional sensor data and batch level sensor data;
   performing transactional processing on the transactional sensor data to generate transactional sensor data processing results, the step of performing transactional processing comprising:
      generating one or more complex event processing (CEP) rules to use with the transactional sensor data;
      processing the transactional sensor data with the one or more CEP rules to generate the transactional sensor data processing results;
      storing the transactional sensor data processing results; and
      forwarding the transactional sensor data processing results when desired;
   and performing batch level processing on batch level sensor data to generate batch level sensor data processing results; and
   combining the results of the transactional processing with the results of the batch level processing using a hybrid-Lambda network architecture such that the transactional sensor data processing results are influenced by the batch level sensor data processing results and/or the batch level sensor data processing results are influenced by the transactional sensor data processing results.

2. The method according to claim 1, further comprising:
   combining a said transactional sensor data processing results from two or more transactional sensor data sources to infer at least one of an event and pattern in regard to the combined transactional sensor data processing results.

3. The method according to claim 1, wherein the step of processing the transactional sensor data with the one or more CEP rules comprises:
   applying CEP rules based on at least one or more of, a type of sensor data, one or more needs of a customer, a type of hardware, the sensor generating the sensor data, and whether transactional or batch level processing is to occur.

4. The method according to claim 3, wherein
   a said transactional sensor data is a sensor data that should be processed in the order of seconds, and
   a said batch level data is any other data.

5. The method according to claim 1, further comprising:
   using combined transactional and batch level processed data outputs as input sensor data to the hybrid-Lamba network architecture to train the hybrid-Lamba network architecture.

6. The method according to claim 3, wherein the step of forwarding comprises
   applying CEP rules that acquire and track batch level data; and
   forwarding the batch level sensor data processing results to an enterprise resource planning business management software suite so that one or more customers can collect, store, manage and interpret the batch level sensor data processing results.

7. The method according to claim 1, wherein
   one or more integration delays that exist in convention transactional-to-batch level processing or batch level-to-transactional processing are substantially eliminated.

8. The method according to claim 1, further comprising:
   identifying any of said transactional sensor data that has been received and mis-identified as a said batch level sensor data;
   converting the mis-identified batch level sensor data to a said transactional sensor data and processing the same as a said transactional sensor data;
   identifying any of said batch level data that has been mis-identified as a said transactional sensor data; and
   converting the mis-identified transactional sensor data to a said batch level sensor data and processing the same as a said batch level sensor data.

9. The method according to claim 8, wherein
   the mis-identified batch level sensor data can include electronic data interchange (EDI) data, and
   the mis-identified transactional sensor data can include a single transaction posting of data transactional events.

10. The method according to claim 1, wherein the step of receiving sensor data comprises:
    receiving the sensor data via an internet-of-things (IoT) protocol adapter, wherein the IoT protocol adapter is adapted to substantially universally translate a said received sensor data into Jason data.

11. The method according to claim 10, further comprising:
    applying a said complex event processing (CEP) rule on the received sensor data and the translated sensor data such that all or substantially all of the received and the translated sensor data is stored as both received sensor data and translated sensor data.

12. The method according to claim 11, further comprising:
    structuring the received and translated sensor data such that the received and translated sensor data are used in a structured manner.

13. The method according to claim 12, further comprising:
    using at least one of a standard software application and a custom software application of a customer on the structured received and translated sensor data for tracking, real-time scoring, and display and report generation.

14. The method according to claim 11, wherein
a substantially real time viewing is performed in an application views module.

15. The method according to 14, further comprising:
using the received and translated sensor data for a scenario population.

16. The method according to claim 15, wherein
the scenario population occurs in a modeling and machine learning module.

17. The method according to claim 16, further comprising:
stripping duplicates from the received sensor data prior to a said translating; and
providing the received sensor data and translated sensor data for further processing.

18. The method according to claim 10, further comprising:
applying a said CEP rule that is an application views CEP rule such that the received and translated sensor data is available for substantially real time viewing.

19. The method according to claim 10, further comprising:
applying at least one or more of said complex event processing (CEP) rules to the received and translated sensor data, wherein the at least one or more CEP rules is adapted to perform domain specific processing on at least one of the received and translated sensor data.

20. The method according to claim 19, wherein the step of performing domain specific processing comprises:
performing a mapping on at least one of the received and translated sensor data; and
generating at least one of events, alerts, and scenario updates.

21. The method according to claim 1, wherein the step of combining the results of the transactional processing with the results of the batch level processing comprises:
performing a batch level processing in a batch layer software module in the hybrid-Lambda network architecture;
performing a transactional processing in a transactional layer software module in the hybrid-Lambda network architecture;
forwarding results from a said transactional processing to the batch layer software module to enable a said batch level processing of the transactional processing results; and
forwarding results from a said batch level processing to the transactional layer software module to enable a said transactional processing of the batch level processing results.

22. The method according to claim 21, further comprising:
re-processing both a said transactional sensor data processing results and a said batch level sensor data processing results to perform at least one of a re-classifying and a re-scoring of the transactional sensor data processing results and the batch level sensor data processing results.

23. The method according to claim 22, wherein the step of re-processing occurs in the batch layer software module.

24. The method according to claim 21, further comprising:
processing both a said transactional sensor data processing results and a said batch level sensor data processing results to create models, such that
at least one of trends and outliers are detected and reported.

25. The method according to claim 24, wherein the step of processing both a said transactional sensor data processing results and a said batch level sensor data processing results occurs in the transactional layer software module.

26. The method according to claim 21, further comprising:
combining the results of a said batch level processing of a said transactional sensor data processing results and the results of a said transactional processing of a said batch level sensor data processing results with at least one of logistics plans, physical things, workforce objects, locations, and time.

27. The method according to claim 26, wherein the step of combining further comprises:
using online transaction processing information systems for at least one of data entry and retrieval transaction processing.

28. The method according to claim 21, further comprising:
storing
the results of a said transactional processing of a said transactional sensor data, with
the results of a said batch level processing of a said batch level data, with
the results of a said batch level processing of a said transactional processing results, with
the results of a said transactional processing of a said batch level processing results, with
one or more of said CEP rules and a said received sensor data in a storage unit.

29. The method according to claim 1, further comprising:
generating reports on a long term basis, wherein the generated long term basis reports are updated in substantially real time by combining a said batch level sensor data with a said transactional sensor data.

30. The method according to claim 29, wherein a said batch level data sensor data processing is used for relatively large data sets, and a said transactional sensor data processing is used for relatively small data sets.

31. The method according to claim 1, wherein the step of performing a said batch level sensor data processing on a said batch level sensor data to generate a said batch level sensor data processing results comprises:
analyzing a said batch level sensor data processing results to build a historical interpretation of a said batch level sensor data processing results; and
creating a new model of a said batch level sensor data processing results based on the historical interpretation of a said batch level sensor data processing results.

32. The method according to claim 1, wherein the step of receiving sensor data comprises:
receiving, by a hybrid-Lambda network, data generated by one or more devices, through a network connection, wherein the generated data comprises data generated by one or more of sensor, mobile device application and other computer systems.

33. The method according to claim 32, wherein
the sensors can be are selected from at least one of those related to reporting time, weather, velocity, acceleration, business data, and financial data, among others.

34. The method according to claim 32, wherein mobile device application generated data comprises:

data generated by an application or software program operating on a mobile electronics device, such as a cellular telephone, personal digital assistant, laptop, tablet, or other portable computing network-connected electronic device.

35. The method according to claim 32, wherein the data generated by other computer systems comprises:

at least one or more of data generated by shipping companies, EDI data; and financial transactions, among other types.

36. The method according to claim 32, wherein the sensor data further comprises:

data generated by one or more separate, network connectable measurement devices or applications, wherein the separate devices are unrelated to a said hybrid-Lambda network architecture but for the receiving of a said sensor data through any type of network.

* * * * *